(12) United States Patent
Aichinger et al.

(10) Patent No.: US 6,517,057 B1
(45) Date of Patent: Feb. 11, 2003

(54) SUPPLY SYSTEM FOR TRANSFERRING A FLUID TO A CONTAINER

(75) Inventors: Heinrich Aichinger, Mannheim (DE); Michael Fried, Berlin (DE); Gerhard Nestler, Ludwigshafen (DE); Oliver Odenwald, Nussloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/700,812
(22) PCT Filed: May 17, 1999
(86) PCT No.: PCT/EP99/03387
§ 371 (c)(1),
(2), (4) Date: Feb. 12, 2001
(87) PCT Pub. No.: WO99/59717
PCT Pub. Date: Nov. 25, 1999

(30) Foreign Application Priority Data

May 19, 1998 (DE) .......................................... 198 22 492

(51) Int. Cl.$^7$ ................................................. B01F 3/04
(52) U.S. Cl. .......................... 261/62; 261/69.1; 261/77; 261/121.1; 141/9
(58) Field of Search .................. 261/62, 64.3, 69.1, 261/72.1, 77, 121.1; 141/2, 4, 5, 9

(56) References Cited

U.S. PATENT DOCUMENTS

| | | | | |
|---|---|---|---|---|
| 4,276,243 A | * | 6/1981 | Partus | 261/121.1 |
| 4,582,480 A | * | 4/1986 | Lynch et al. | 261/121.1 |
| 4,622,209 A | | 11/1986 | Nardi et al. | |
| 4,640,323 A | | 2/1987 | Norcia et al. | |
| 4,859,375 A | * | 8/1989 | Lipisko et al. | 261/121.1 |

FOREIGN PATENT DOCUMENTS

| | | |
|---|---|---|
| DE | 197 49 859 | 7/1998 |
| EP | 0 064 628 | 11/1982 |
| EP | 0 136 029 | 4/1985 |

* cited by examiner

*Primary Examiner*—C. Scott Bushey
(74) *Attorney, Agent, or Firm*—Oblon, Spivak, McClelland, Maier & Neustadt, P.C.

(57) ABSTRACT

A supply system for feeding a fluid to a vessel (1) is described, which is provided with a feedline (10), having a reservoir which is filled with the fluid and a compressed-gas store (14) which can be brought into communication with this reservoir (13), in which system the reservoir (13) and the compressed-gas store (14) are arranged in immediate proximity to one another, and wherein the reservoir (13) can, when required, be brought into communication with the feedline (10) via connection pieces (11, 12).

19 Claims, 2 Drawing Sheets

SUPPLY SYSTEM FOR TRANSFERRING A FLUID TO A CONTAINER

BACKGROUND OF THE INVENTION

1. Field of the Invention

A supply system for feeding a fluid to a vessel is used, in particular, for the later stabilization of substances which are usually stored in vessels or storage tanks and which have a considerable tendency toward undesirable chemical reactions, for example premature polymerization, or other physical reactions, for example crystallization.

2. Discussion of the Background

It is known that certain substances or combinations of substances, in solid or dissolved form, are suitable for restabilizing polymerizable substances which react at an undesirable time. These substances can be introduced into the stored material in a conventional manner and can then be mixed with the contents of the tank using the pump which is customarily provided for filling and emptying the storage tank device. A drawback of this is that pumps themselves may form the starting point for premature polymerization, resulting in the pump becoming blocked. Therefore, if required, the mixing work can no longer be carried out. A further drawback is the need for an external power source for driving the pump which, in an emergency or by chance, may be unavailable, making it impossible to introduce stabilizing liquid.

Therefore, in order to be independent of external power sources, a mixing method which involves blowing in gases is also used. A drawback of this method is that additional internals are required in or on the tank. Generally, such internals have to be secured fixedly to the tank, in order not to be damaged or torn off during normal operation. In order to be effective, i.e. to achieve intimate mixing, internals for injecting gases are usually situated in the vicinity of the bottom of the tank. When these internals are not in use, the reactive substance may penetrate into the internals, where it will generally polymerize owing to the low level of exchange of materials, thus making the gas feed unusable when it is required. For this reason, a slight flow of air is often fed through such lines in order to keep them clear. However, an air flow of this nature also requires the apparatus to be monitored, in order to prevent the liquid stored in the tank from rising back up and to keep the line open. Such designs have proven expensive if they are to fulfill their role reliably.

EP-B-0,064,628 describes a device for emergency short-stopping of polymerization reactions in a closed reaction vessel by adding inhibitor solution. The inhibitor solution is added in the lower part of the vessel via a connection flange which is closed off by a rupture disk. An angled-off riser pipe leading to an upper flange, to which a compressed-gas line is connected, is arranged on this connection flange. The riser pipe is filled with an inhibitor solution which, when required, is forced into the vessel at high pressure by a compressed gas. The compressed gas comes from a compressed-gas cylinder which is connected to the riser pipe via the compressed-gas line.

Due to the immediate proximity of the inhibitor solution to the vessel, the inhibitor solution itself may, particularly in dangerous situations, already have been damaged before it is fed into the vessel, so that it is no longer able to fulfill its actual role. In addition, there is a risk, with the known rupture disk arrangement, of the rupture disk breaking prematurely, making the monomer stored in the tank unusable. The resultant contamination of the storage device then requires lengthy cleaning work owing to the high strength of the inhibitor.

Furthermore, checking the inhibitor solution inside the riser pipe is a complex operation, since this requires the riser pipe to be emptied and refilled. Particularly if there are a plurality of vessels, this represents a considerable drawback. Finally, there is also a risk of the inhibitor solution icing over if the temperatures fall excessively.

SUMMARY OF THE INVENTION

The problem on which the invention is based therefore consists in providing a supply system for feeding a fluid to a vessel which is provided with a feedline, which system has a reliable and simple structure and only requires a low level of investment.

According to the invention, the reservoir and the compressed-air store are arranged in immediate proximity to one another, and the reservoir can, when required, be brought into communication with the feedline via a connection piece.

This supply system can be attached to or removed from the vessel at any time. As a result, its correct operation can be tested easily periodically. Due to the structure of the supply system, it can be used on vessels of very different volumes without changing its structural dimensions.

In the supply system according to the invention, liquid or gaseous substances are introduced into the material and the substances are at the same time mixed with the material. The high-pressure fluid can be introduced into the vessel for the purpose of stabilizing the substances inside the vessel and may be a mixture of a gas and a liquid.

DETAILED DESCRIPTION OF THE INVENTION

Preferred configurations are explained below.

In order to prolong the period for which the fluid is fed into the vessel, means for reducing the pressure are provided between the compressed-gas store and the reservoir for the fluid, by means of which means the pressure of the compressed gas acting on the reservoir can be reduced to such an extent that a desired flow rate of the fluid is not exceeded. In this case, it is also important for the compressed gas which follows on after the fluid has been forced out of the reservoir likewise not to exceed a certain flow rate, so that the discharge of the compressed gas in the liquid-filled vessel can be used to mix the contents of the vessel intimately.

Advantageously, the reservoir and the compressed-gas store are designed as a portable unit. This makes it possible to use the supply system for a plurality of vessels.

Since at least some of the fluid stored in the reservoir remains in the feedline and is not fed to the vessel by the compressed gas, it is advantageous, in order to maintain compact supply systems, if the length of the feedline leading to the vessel does not exceed 500 m and is at least 10 m for safety reasons.

In order to obtain intimate mixing when feeding fluid into a liquid which is situated in the vessel, it is advantageous if the pressure inside the storage vessel does not exceed 10 bar, preferably 6 bar. Feeding fluid or compressed gas into the liquid situated in the vessel results in intimate mixing due to the formation of relatively large bubbles. If an excessively high pressure is selected, the bubbles remain small and the mixing effect brought about by the rising bubbles is slight.

A further advantage of a relatively low pressure in the feedline consists in the fact that the supply system can be connected to the feedline of the vessel, by means of the connection piece, even when the compressed-gas store is open, without this requiring an excessive application of force.

A transmission ratio of the diameter which is active in transmitting force to the connection piece to the hydraulic diameter of at least 2:1 allows the application of force to be reduced further.

Figure 1:
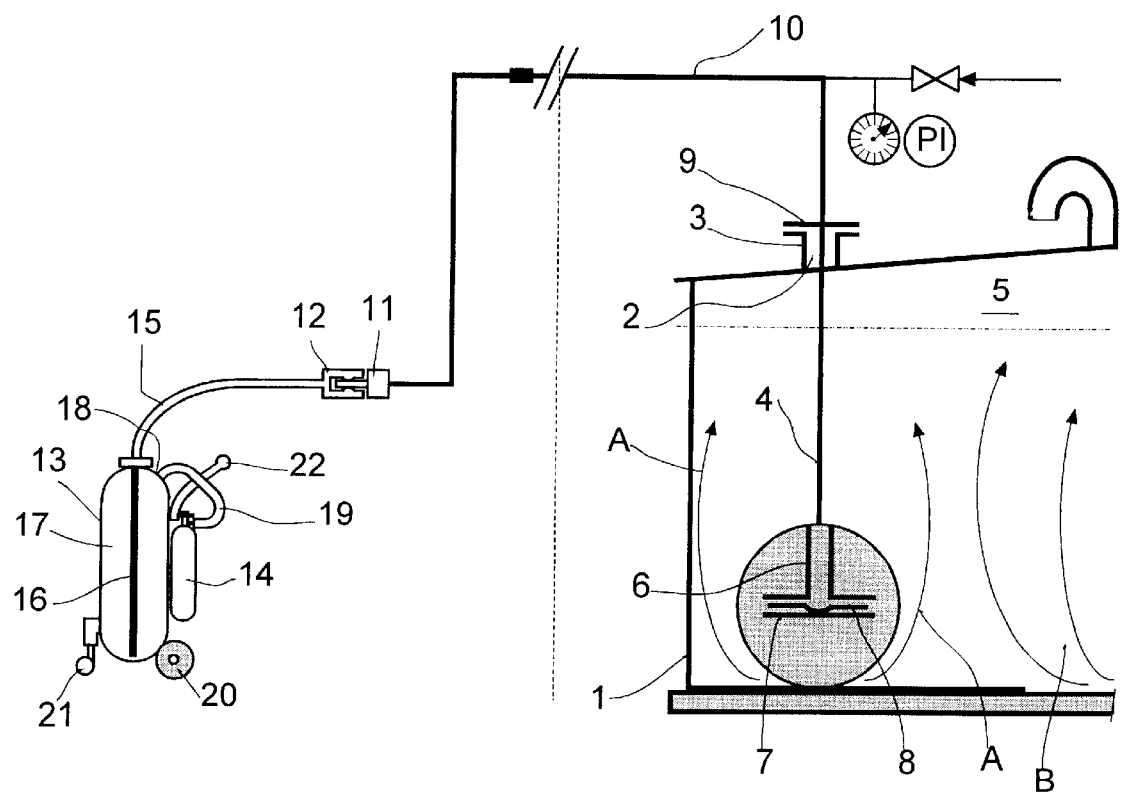
FIG. 1 shows a diagrammatic illustration of the supply system connected to a vessel.

FIG. 1 shows a diagrammatic illustration of a supply system according to the invention which is connected to a vessel 1. The vessel 1 has an opening 2 with a vertical connection flange 3. A pipe 4 of a device for introducing fluid into the interior 5 of the vessel 1 projects through the opening 2.

That end 6 shown in an enlarged scale of the pipe 4 which is situated in the interior 5 is provided with a holder 7 for a rupture disk 8. At least when actuated, the rupture disk 8 is arranged inside the vessel liquid and in the proximity of the bottom of the vessel, so that the rising gas bubbles brought about by injecting gas cause an upwardly directed flow, as illustrated by the arrows A. This upward flow in the area of the pipe 4 also induces a corresponding flow, illustrated by the arrows B, in adjoining areas.

The other end of the pipe 4 is provided with a bearing flange 9 for attachment to the flange 3 of the vessel 1, it being possible for the attachment to be direct or to use an intermediate flange. A feedline 10 for the fluid which is to be introduced into the interior 5 is connected to this pipe 4.

The supply system according to the invention is fed with the liquid to be introduced via a feedline 10 which is connected to the pipe flange 9. A suitable volume of this fluid, at a suitable pressure, is situated in the supply system and is only connected to the feedline 10 (for which purpose coupling means 11, 12 are provided) in the event of hazardous situations. Generally, the fluid to be introduced is a liquid which is situated in a reservoir 13. This reservoir 13 is fixedly connected to a compressed-gas store in the form of a propellant gas cylinder 14. Opening the propellant gas cylinder 14 firstly expels the liquid from the reservoir 13 and introduces it into the tank contents via the pipe 4. The excess gas which flows after it brings about intensive intimate mixing of the tank liquid with the injected fluid due to the vertical flows generated by rising gas bubbles. It is sufficient for the pressure vessel to be connected to the feed pipe 10 immediately before the gas cylinder is opened, by means of a quick-fitting coupling 11, 12.

The quick-fitting coupling 11, 12 is connected to the reservoir 13 via a flexible hose 15. A discharge pipe 16, one end of which extends almost to the bottom of the reservoir 13 while the other end is connected to the hose 15, is situated inside the reservoir 13. The reservoir 13 is filled with an inhibitor solution 17, but in its upper part has a connection 18 for a compressed-gas feedline 19 which is connected to the compressed-gas store 14.

The reservoir 13 is provided with rollers 20, 21 and a handle 22, so that the supply system can be moved manually.

If the supply system is actuated, a pressure builds up in the pipe 4. When the pressure which is required to break the rupture disk 8 is reached, the pressure of the fluid is released into the vessel interior 5 through the pipe 4. If the fluid which then flows in is a mixture of liquid and gas, the gas which subsequently flows in mixes the liquid which has been forced in with the contents of the vessel.

Figure 2:
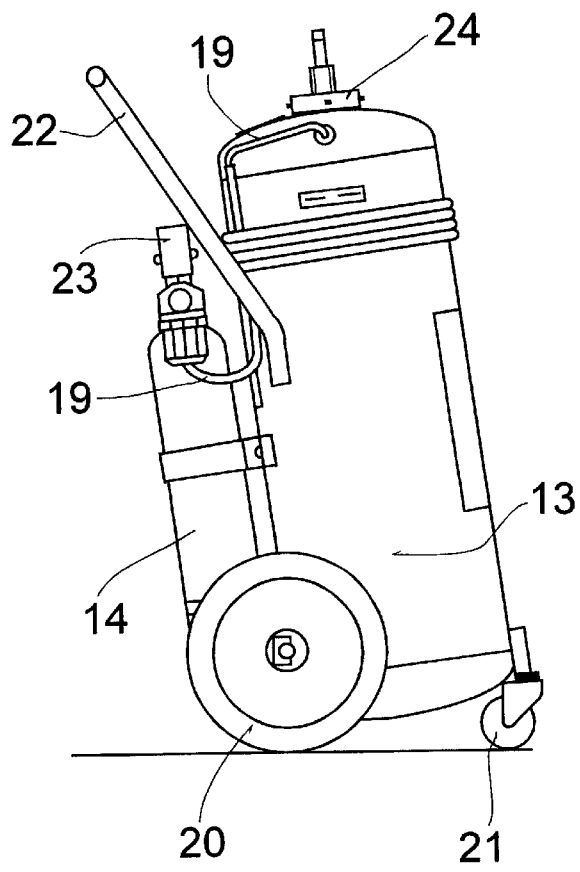
FIG. 2 shows a side view of a supply system that can be moved by hand.

FIG. 2 shows a side view of the supply system, including the wheels 20, 21, the wheels 20 essentially supporting the weight of the supply system and the wheel 21 being designed as a castor. For ease of handling, a handle 22 is arranged on the reservoir 13.

The compressed-gas store 14, which is in communication with the top end of the reservoir 13 via a connecting line 19, is also arranged on the reservoir 13. Between the reservoir and the compressed-gas store, there is a pressure-reducing valve 23, by means of which the pressure of the gas which leaves the compressed-gas store 14 at a high pressure can be reduced to a constant pressure of approximately 6 bar. The reservoir 13 has a filling opening, the closure 24 of which is provided with a safety pressure-control valve.

Figure 3:
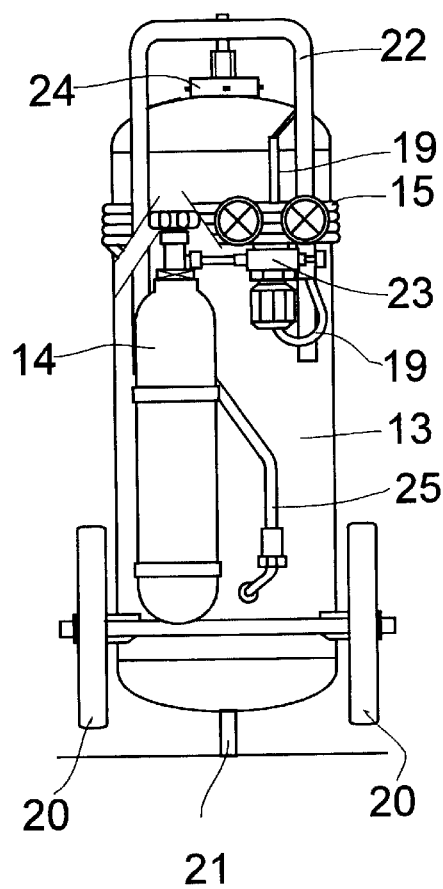
FIG. 3 shows a side view of the supply system from FIG. 2, moved through 90°.
Figure 4:
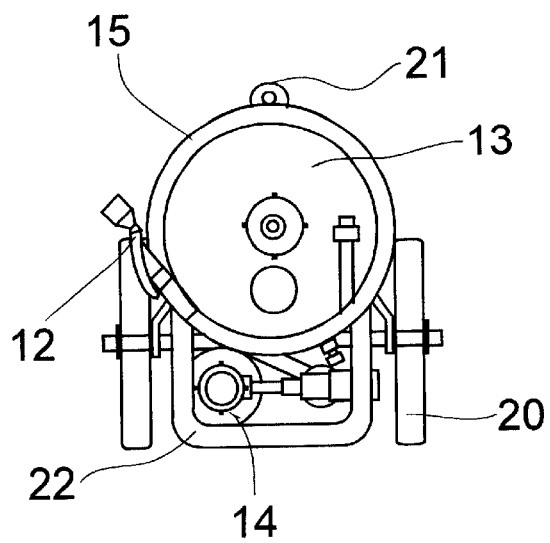
FIG. 4 shows a plan view of the supply system illustrated in FIG. 2.

With regard to FIG. 3, it should be noted that the supply system is shown in an upright position, without the inclination shown in FIG. 2, which amounts to approximately 9°. FIG. 4 also shows a plan view of the upright supply system. It is possible to see the reservoir 13, the compressed-gas store 14 attached thereto, the wheels 20, 21 and the handle strap 22. The hose 15, the end of which is provided with a connection piece 12, is wound around the reservoir 13. This connection piece 12 is designed in such a way that the introduction of force required to make the connection can be exerted over a diameter D which is at least twice as great as the hydraulic diameter d. It is therefore possible, within the stated pressure range of approximately 6 bar, to manually connect the hose 15 to the line 10 even when the compressed-gas store is already open and is therefore applying pressure to the reservoir 13. In this case, removal is via an external line 25 which receives the inhibitor solution at the bottom of the reservoir. The line 25 is connected to the hose 15.

Since it is preferable for large vessels with increasing volumes to be square in cross section, the preferred application range for the invention is for vessels with a volume of from 20 to 1000 $m^3$, corresponding to a vertical pipe length of 3 to 11 meters. The overall result, in conjunction with suitable containers for accommodating the stabilizer liquid and suitable quick-fitting couplings, is an inexpensive supply system which operates reliably and requires little maintenance, in particular for storing reactive substances.

The supply system is particularly suitable for carrying out a method for immediately terminating free-radical polymerization reactions by adding a phenothiazine-containing (PTZ) inhibitor solution to the system undergoing free-radical polymerization, at least 45% by weight of the solvent in the inhibitor solution comprising an N-alkylpyrrolidone. The N-alkylpyrrolidone may be N-methylpyrrolidone and/or N-ethylpyrrolidone.

Furthermore, it is advantageous if the phenothiazine forms at least 10% by weight, preferably approximately 45–55% by weight, of the inhibitor solution, based on the weight of the inhibitor solution. The device can be used to particular effect if the system undergoing free-radical polymerization involves (meth)acrylic monomers which undergo free-radical polymerization in bulk, where the (meth)acrylic monomer may be a (meth)acrylic acid and, in particular, a (meth)acrylate.

The amount of phenothiazine required to immediately terminate free-radical polymerization reactions is dependent on the amount of free radicals involved in the reaction. Tests have shown that in most cases concentrations of between 200 and 300 ppm phenothiazine are sufficient to limit the polymerization to such an extent that it no longer represents any threat.

A 50% strength solution of phenothiazine in N-alkylpyrrolidone remains sufficiently fluid for practical use down to temperatures of −10° C. Furthermore, it has been found that freezing does not occur even at temperatures of as low as −20° C. Nevertheless, the solution, and therefore the supply system, should be stored in a heated store. In this case, there is no need to take any special measures relating to the explosion or fire risk.

The 50% solution of phenothiazine/N-alkylpyrrolidone (w/w) can be stored under standard storage conditions for approximately five years. Tests carried out for six months at 60° C. with the exclusion of oxygen caused only slight changes.

Since concentrations of 250 ppm phenothiazine are sufficient for immediate termination of free-radical polymerization reactions, a few supply systems can be used to protect all possible vessel sizes.

Table 1 below shows the amounts required based on the particular vessel volume and a height/diameter ratio, as well as the volume of mixing gas and the mixing time.

TABLE 1

| Tank volume [m³] | 20 | | | 100 | | | 1000 | | |
|---|---|---|---|---|---|---|---|---|---|
| Ratio [H/D] | 1 | 1.5 | 2 | 1 | 1.5 | 2 | 1 | 1.5 | 2 |
| Amount of PTZ in [kg] 250 ppm | 5 | 5 | 5 | 25 | 25 | 25 | 250 | 250 | 250 |
| Reservoir in [liter] | 10 | 10 | 10 | 50 | 50 | 50 | 500 | 500 | 500 |
| Gas cylinder in [liter] 200 bar | [2] | [2] | [2] | 6 | 6 | 6 | 60 | 60 | 60 |
| Volume of the mixing gas in [m³] 1 bar | 0.2 | 0.2 | 0.2 | 1.2 | 0.8 | 0.6 | 12 | 8 | 6 |
| Mixing time in [min] | 7.0 | 5.5 | 5.0 | 8.5 | 7.5 | 7.0 | 16 | 15 | 14 |

The feed time of a 50% PTZ solution via a 100 m long horizontal line with a 10 m long riser pipe at a feed pressure of 6 bar is shown in Table 2. The feed duration is shorter than the overall injection duration.

Table 2 shows the time required to feed fluid into the vessel for a volume of 50 l for a vessel of 100 m³ and 500 l for a vessel of 1000 m³. These times take into account the pipeline losses for a 100 m long horizontal feedline and a 10 m long vertical feedline. The feed times are dependent not only on the length and diameter of the pipelines but also on the metered volumes. From this, it can be assumed that, on the basis of the actual conditions, a higher metering volume results in a longer feed time even despite increased pipeline cross sections.

TABLE 2

| Feedline | | Duration of feed [minutes] | | | | Remarks |
|---|---|---|---|---|---|---|
| Diameter [mm] | | 100 | | 1000 | | Tank volume [m³] |
| horizontal: | vertical: | −10 | +10 | −10 | +10 | Temp. [° C.] |
| 30 | 15 | 1.5 | 0.9 | 14.6 | 9.3 | |
| 40 | 20 | 0.5 | 0.5 | 4.7 | 4.5 | |
| 50 | 25 | 0.25 | 0.25 | 2.5 | 2.6 | |
| 60 | 30 | 0.16 | 0.16 | 1.6 | 1.6 | |

The high concentration of the solution makes it possible to use small supply systems. To store the phenothiazine solution, it is advantageous to use reservoirs made from stainless steel, since although the solution does not attack standard steel it can be affected by rust. The low weight of the supply systems used means that they are portable. They can therefore be stored at protected sites and moved to the appropriate site and location when required. This has a beneficial effect on the maintenance costs. For stores with more than one vessel, a single supply system, or a small number of supply systems, is sufficient, with the result that the investment costs are low compared to the individual connections between the vessels in question and one supply system each or a central supply system which are customarily used.

Intimate mixing of the vessel contents is essential for the polymerization reactions to be terminated immediately. To achieve this, it is advantageous if the gas is fed at a comparatively low mass flow rate, so as to form large gas bubbles. As these gas bubbles rise to the surface, they produce a steady convective flow of the vessel contents. Limiting the pressure of the gas fed in to 10 bar, preferably 6 bar, takes this into account. The pressure reduction may be established either by means of special pressure-reducing valves within a certain range or by means of fixedly installed restrictor orifices.

An advantage of the system consists in the fact that the fluid can be injected from a safe location and at a considerable distance from the vessel which is advantageously 10 to 500 m. The diameter of the feedline is dependent on the size of the vessel, and for vessels of up to 100 m³ is between 25 and 40 mm, and for vessels between 100 and 1000 m³ is at least 50 mm. It is necessary here to take into account the fact that feedlines with excessive dimensions entail a loss of fluid and mixing gas due to incomplete conveyance of the fluid inside the pipeline.

Although the compressed gas flowing out of the compressed-gas store initially only presses the fluid inside the reservoir into the pipeline, so that the gas in the pipeline is already compressed and, if appropriate, made to flow out into the vessel 1. As soon as all the fluid has been conveyed out of the reservoir 13 into the feedline 10, there is a risk that the compressed gas will not push the fluid in front of it in the manner of a stopper, but rather will flow by between the inner wall of the feedline 10 and the fluid without conveying the fluid onward. This is only possible when the fluid in the reservoir 13 has been discharged to a sufficient extent for the compressed gas to be able to flow into the removal pipe 16.

We claim:

1. A supply system for feeding a fluid to a vessel (1) comprising:
    a feedline (10) connected to said vessel (1),
    a reservoir (13) which is filled with a fluid comprising a polymerization inhibitor and a solvent,
    a compressed-gas store (14) connected to the reservoir (13), wherein the reservoir (13) and the compressed gas store (14) are arranged in immediate proximity to one another,
    a pipe (4) connected to the feedline (10), wherein said pipe (4) extends into the vessel (1), and said pipe (4) is terminated with a rupture disc (8),
    wherein said reservoir (13) connects with said feedline (10) by contacting elements (11, 12), and said feedline (10) includes a pressure regulating valve.

2. A supply system as claimed in claim 1, wherein the reservoir (13) and the compressed-gas store (14) are a portable unit.

3. A supply system as claimed in claim 1, wherein the pressure inside the storage vessel (1) does not exceed 10 bar.

4. A supply system as claimed in claim 1, wherein the contacting elements (11, 12) can be connected to the feedline (10) of the vessel (1) even when the compressed-gas store (14) is open.

5. A supply system as claimed in claim 4, wherein the ratio of a diameter D which is active in transmitting force to the contacting elements (11, 12) to a hydraulic diameter d is at least 2:1.

6. A supply system as claimed in claim 1, wherein the pressure inside the storage vessel (1) does not exceed 6 bar.

7. A supply system as claimed in claim 1, wherein the polymerization inhibitor comprises a phenothiazine.

8. A supply system as claimed in claim 1, wherein the fluid comprises at least 45% by weight of a solvent.

9. A supply system as claimed in claim 8, wherein the solvent is an N-alkylpyrrolidone.

10. A supply system as claimed in claim 1, wherein the supply system further comprises a discharge pipe (16) connected to the feedline (10) and extending nearly to the bottom of the reservoir (13).

11. A supply system as claimed in claim 2, wherein said portable unit further comprises wheels (20, 21).

12. A method of terminating free-radical polymerization reactions in a vessel (1) filled with a free-radical polymerizable substance comprising:
  connecting the supply system of claim 1 to said vessel (1) via contacting elements (11, 12) and feedline (10),
  pressurizing said fluid in said reservoir (13) with the compressed-gas store (14), thereby allowing said fluid to enter said vessel and mix with the free-radical polymerizable substance therein.

13. The method as claimed in claim 12, wherein the reservoir (13) and the compressed-gas store (14) are a portable unit.

14. The method as claimed in claim 12, wherein the pressure inside the storage vessel (1) does not exceed 10 bar.

15. The method as claimed in claim 12, wherein the pressure inside the storage vessel (1) does not exceed 6 bar.

16. The method as claimed in claim 12, wherein the polymerization inhibitor comprises a phenothiazine.

17. A method of terminating free-radical polymerization reactions in a vessel (1) filled with a free-radical polymerizable substance comprising:
  connecting the supply system of claim 10 to said vessel (1) via contacting elements (11, 12) and feedline (10),
  pressurizing said fluid in said reservoir (13) with the compressed-gas store (14), thereby allowing said fluid to enter said vessel and mix with the free-radical polymerizable substance therein.

18. The method as claimed in claim 12, wherein two or more supply systems are connected to the vessel (1).

19. The method as claimed in claim 12, wherein the fluid comprises at least 45% by weight solvent.

* * * * *